United States Patent [19]
Moller

[11] Patent Number: 6,009,457
[45] Date of Patent: *Dec. 28, 1999

[54] DISTRIBUTED REAL-TIME COMMUNICATIONS SYSTEM

[75] Inventor: Matthew Donaldson Moller, West Falmouth, Mass.

[73] Assignee: Rocket Network, Inc., San Francisco, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/636,219

[22] Filed: Apr. 22, 1996

Related U.S. Application Data

[63] Continuation-in-part of application No. 08/626,032, Apr. 1, 1996, abandoned.

[51] Int. Cl.$^6$ .............................. G06F 13/38; G06F 15/17
[52] U.S. Cl. .......................... 709/203; 345/302; 709/205
[58] Field of Search .................. 345/302; 395/200.33, 395/200.35, 200.61, 200.78, 551; 84/645, 602, 609, 610, 634; 709/203, 205, 231, 248; 713/400

[56] References Cited

U.S. PATENT DOCUMENTS

| | | | |
|---|---|---|---|
| 5,020,101 | 5/1991 | Brotz et al. | 379/389 |
| 5,265,248 | 11/1993 | Moulios et al. | 395/650 |
| 5,388,264 | 2/1995 | Tobias, II et al. | 395/650 |
| 5,398,278 | 3/1995 | Brotz | 379/90 |
| 5,602,992 | 2/1997 | Danneels | 395/200.19 |
| 5,661,665 | 8/1997 | Glass et al. | 348/423 |
| 5,670,732 | 9/1997 | Utsumi et al. | 84/645 |

FOREIGN PATENT DOCUMENTS 63-105590   5/1988   Japan .

OTHER PUBLICATIONS

John Motavalli, Service Lets Musicians Jam over the Internet, Yahoo! Internet Life (Jul. 28, 1997) <http://www3.zdnet.com//yil/content/depts/dblscoop/ 9707/ds970728.html#scoop>.

One World Under a Groove, The San Francisco Bay Guardian, Dec. 17, 1998.

Res Rocket's Ancient History (visited May 5, 1998) <http://www.resrocket.com/ipk/history/index.html>.

Matthew D. Moller, The Distributed Real–Time Groove Network (copyright 1995) <http://www.ctd.nwu.edu/drgn/aborted.qedit>.

(List continued on next page.)

*Primary Examiner*—Mark H. Rinehart
*Attorney, Agent, or Firm*—Finnegan, Henderson, Farabow, Garrett & Dunner

[57] ABSTRACT

A method and apparatus is provided which enables users to communicate in a perceived real time environment. In one embodiment a number of musical parts are contributed one each from a number of client terminals. Each terminal generates and sends to a server a short sequence or sequence of sequences, for example a few bars of music. The server echoes the sequences out to each of the other clients' terminals where they are synchronised to a local clock and repeated a plurality of times, with the generated sequence being repeated at the sending client a similar number of times. The local synchronisacion overcomes the problems of propagation delay between clients and server and the repetition of sequences allows a continuous stream of data to be output at each client.

A solo, or non-repetitive line may be added by commencing sending the solo line to the server before the remaining lines. The solo line is buffered at each of the clients and then synchronized to the local clock. The non-solo lines arrive at the solo client after the solo data stream has commenced. However, as they are repetitive they are synchronised by the local clock to the next sequence repeat.

30 Claims, 10 Drawing Sheets

OTHER PUBLICATIONS

J.G. Liu et al., DMTS: a Distributed Multimedia Telenetworking System, Proceedings of the 20th Conference on Local Computer Networks, pp.. 326–335, 1995.

T.T. Doan, Understanding MIDI, IEEE Potentials, 10–11, 1994.

Wu–Hon F. Leung et al., A Software Architecture for Workstations Supporting Multimedia Conferencing in Packet Switching Networks, IEEE Journal of Selected Areas in Communications, pp. 380–389, 1990.

International Search Report for PCT GB97/00870 filed Mar. 27, 1997.

Akvildiz, Ian F. et al, "Multimedia Group Synchronization Protocols for Integrated Services Networks", IEEE Journal on Selected Areas in Communications, Jan. 14, 1996, pp.162–173.

Venkat Rangan, P. et al, "Communication Architectures and Algorithms for Media Mixing in Multmedia Conference", IEEE/ACM Transactions on Networking, Feb. 1, 1993, pp. 20–30.

Escobar, Julio et al. "Flow Synchronization Protocol", IEEE/ACM Transactions on Networking, Apr. 2, 1994, pp. 111–120.

Ferrari, Domenico, "Delay Jitter Control Scheme for Packet–Switching Internetworks", Computer Communications, Jul./Aug. 15, 1992, pp. 367–373.

Steve Nadis, "Cyberjam Grooves", *Popular Science,* Jan., 1996.

David Dishneau, "Real–Time Groove Network Creates a Virtual Band", *The Maui News,* Jun. 9, 1995.

Lou Carloze, "New Software Puts Jam Sessions On Line", *Boston Globe,* Aug. 9, 1995.

Raid Kanaley, "Musicians Are Jamming Worldwide on the Internet", *The Philadelphia Inquirer,* Jun. 17, 1995.

Michele S. Netto, "Novel Software???? Musicians on Internet", *The Enterprise,* Jul. 4, 1995.

FIG. 12

DISTRIBUTED REAL-TIME COMMUNICATIONS SYSTEM

RELATED INVENTION

This is a continuation-in-part of U.S. patent application Ser. No. 08/626,032 entitled: DISTRIBUTED REAL TIME COMMUNICATIONS SYSTEM, filed Apr. 1, 1996, now abandoned.

FIELD OF THE INVENTION

This invention relates to real-time communication between distributed clients as a client server network. It is particularly, but not exclusively, suited to enabling client users to play music with one another in real time.

BACKGROUND TO THE INVENTION

A client-server paradigm is a computer system in which distributed clients use a common server for data transfer and manipulation. A schematic example is shown in FIG. 1 in which a server 10 communicates with three distributed client computers 12. The server can run programs as well as act as a simple 'dumb' data transfer hub. Each client can send data to any other client connected to the server by sending the data through the server allowing exchange of information with each of the other clients through a common data transfer system such as a computer network.

Client server technology is well established and widely used, for example in financial fields where brokers use real-time data services to keep up to date with movements in stock prices. The information received in these systems is perceived to be real-time as any delay is minimal and unimportant. However, if the client server paradigm is being exploited to enable a plurality of distributed clients, say in a number of different countries, to communicate their time delays can become important. This is especially the case where the clients collaborate and interact with one another in real-time where the actions of each client will determine or affect the reactions of other clients and these actions are highly time dependent, for example, when playing music in an ensemble. In such systems the inherent time delays which are imposed makes an immediate, instantaneous response impossible. This is particularly true in modern computer networks where delays may occur of up to several seconds. This length of delay would make real-time music performances between distributed musicians impossible. Delays of even a few milliseconds can be aeschetically, displeasing.

It is desirable for musicians to be able to interact over computer networks to enable them to play together in real-time in distributed locations. However, there is no way to have a plurality of clients send and receive data simultaneously. Even with the fastest networks which transmit data at the speed of light, trans-continental data transfer has a lag which is both noticeable and unacceptable for many musical situations.

SUMMARY OF THE INVENTION

It is therefore an object of the invention to provide a system which allows clients in distributed locations to interact in real-time.

It is a further object of the invention to provide a method and apparatus for synchronising time-dependent information from a plurality of sources.

It is a still further object of the invention to provide a method and apparatus which permits a plurality of performers to perform in real, time together from distributed locations.

It is a further object of the invention to provide a method and apparatus which allows clients to interact in real time from distributed locations in which one client provides an improvised non-repetitive data stream.

The invention is defined by the independent claims to which reference should be made.

In a preferred embodiment of a first aspect of the invention, a method and apparatus is provided for synchronising data from a plurality of sources. A data stream from a first source is generated and sent to a server where it is distributed to all participating clients. Each client sends its own data stream which in turn is echoed to each client. Received data streams at each client are synchronised to a local clock and continuity is maintained by looping back the data streams so that each is repeated a plurality of times.

This embodiment allows interactive communications over, for example a computer network, to be synchronised regardless of the differences in time delays between the server and individual clients. It is applicable to media such as music where each client's data stream represents one musical part and the server echoes the ensemble out to each client. The stream of data generated by each client represents a musical sequence. In one preferred embodiment of the invention one or more of the clients generates a sequence of sequence, or a macro sequence. This enables more musically complex patterns to be played so increasing the flexibility and usefulness of the invention.

As the first aspect of the invention relies on the looping back of each data stream to achieve continuity, and so the effect of real time performance, it necessarily precludes improvisation or non-sequential data from the clients. In the performance of music this is disadvantageous as it limits the creativity and artistry which can be expressed by any of the players.

A second aspect of the invention provides a method and apparatus which allows the data stream from one of the clients to he a non-sequential, non-repetitive stream which is not looped back and which can be representative of an improvised musical line.

In a preferred embodiment of the second aspect of the invention the client providing the improvised or 'solo' line commences sending its data stream to the server before the remaining clients. The server echoes this data to the clients each of which hold it in a local buffer and then synchronise it with their own local clocks. The relative synchronisation of the remaining clients is handled in the same manner as the first aspect of the invention. In this manner all the parts are synchronised at all the clients. That fact that the non-solo data streams arrive at the solo client after commencement of the solo line does not matter as those lines are repetitive and simply require synchronisation to the local clock.

Preferably the delay between sending the solo client data to the clock and sending the remaining data streams is approximately equal to the longest delay between a client and the server.

DESCRIPTION OF DRAWINGS

Preferred embodiments of the invention will now be described by way of example only, and with reference to the accompanying drawings in which:

FIG. 12 shows, using conventional musical notation, the sequences which would be received by a client server and their relative timings where there are four clients;

DESCRIPTION OF BEST MODE

The problem expressed earlier was one of transmission speed; the laws of physics dictate that the maximum transmission speed is the speed of light which is insufficiently fast to synchronise clients in intercontinental locations.

We have appreciated that this problem may be avoided by breaking a line of information or data down into one or more streams of data at each client and sending those streams to the server. As the server echoes all of the individual data streams to all of the clients other than the sending client each client receives all of the data streams generated by the other clients. The individual clients then reassemble the data, holding the streams in synchronisation with each other through a respective local clock.

In the remaining part of the description the data streams will be discussed in terms of musical parts However, it is co be understood that the invention is not confined to the synchronisation of a plurality of musical parts but is applicable to any time dependent or time ordered data which can be represented digitally an includes, for example, audio and video. The invention will also be described in the context of each client generating a single part. However, there is no reason why a given client could not contribute more than one part to the ensemble.

Thus, musical information is represented as a combination of multiple musical elements which is analogous to an orchestra in which a number of separate instruments play separate lines of music in synchronism to produce a single composition. In the present invention each instrumental part is represented by a data steam.

Figure 1:
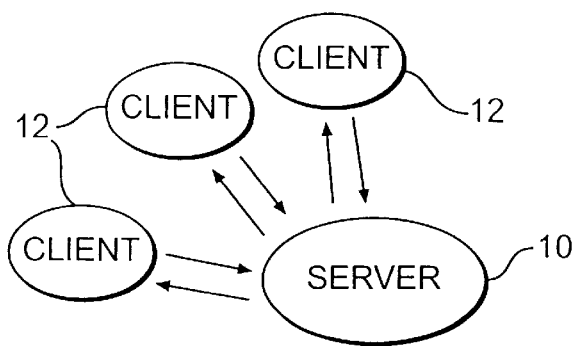
FIG. 1, discussed previously, is a schematic diagram of a client server paradigm.

Before describing how the data streams are assembled it is helpful to consider the hardware requirements of the system. In its simplest form the network comprises a server computer and a plurality of client computers as illustrated in FIG. 1.

Figure 2:
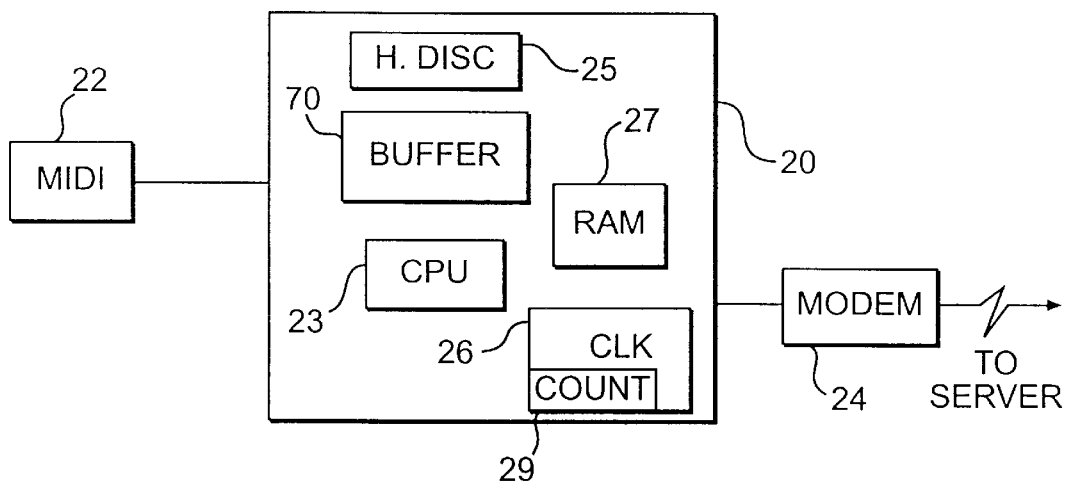
FIG. 2, is a schematic view of a client terminal.

A typical client is illustrated in FIG. 2. The computer 20 may be of any type, for example a PC or MAC which has a MIDI (Musical Instrument Digital Interface) Interface 22 and a modem 24. The MIDI interface serves as a means for inputting data. The client computer includes a CPU 23 which, apart from other tasks can read the data input from the MIDI, Hard Disc 25 and Random Access Memory (RAM) 27. The client software establishes and manages data transfer which the server via TCP/IP (Transmission Control Protocol/Internet Protocol). Musical information is sent both to and from the server. The client software allows users to record musical information via the standard MIDI interface.

This information is time stamped relative to a locally running clock 26 and then sent out to the server to be echoed to each client. The client terminal includes a means for setting the clock at a desired count frequency (not shown). In the example described a MIDI input is used and is preferred as the data is compact and efficient to send making it ideal for working within stringent bandwidth requirements. However, other inputs could be used, such as a digital audio or video input.

The client software also received MIDI data from the server and outputs MIDI data. This is data from all of the clients. Thus, as well as being recorded on any standard MIDI device it can also be played back on any standard MIDI device. The MIDI events are synchronised and played back relative to the local clock 26. Again the MIDI device is only a preferred playback medium.

The format of the data which is received and time stamped by each client MIDI is variable. Each note can be represented, for example, by four pieces of information: when the note was played (the relative timing), what note it was (its pitch), for how long it was played, and how loudly the note was played (its amplitude). More sophisticated data representations such as digital audio can be used but these have the disadvantage of high information content and is inefficient on the relatively small networks available to consumer Internet users. The essential identifying data is the relative timing of the note. Other parameters may be included, such as vibrato, accent, staccato etc.

Referring back to the structure of the data, each client produces time-dependent streams of musical information indicative of one part, such as a bass or a melody line, which must be synchronised locally with all of the other streams being produced by other clients. The client software time stamps the outgoing streams with a time relative to the local clock. As has been discussed, free improvisation is not possible as the inherent delays in transferring data to the plurality of clients are aesthetically unacceptable. It is also important that there is a continuous flow of music. This is difficult as continuity is not inherent. If people cannot respond immediately then the inherent delays compound and a continuous flow of sound cannot be maintained.

Figure 3:
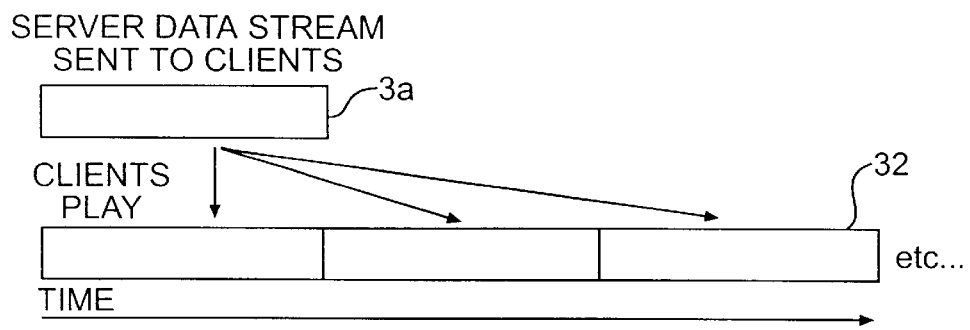
FIG. 3, is a schematic diagram illustrating the looping of data streams and embodying a first aspect of the invention.

We have appreciated that a continuous stream of sound can be produced by setting a loop point. For example, a bass drum pattern can be set which is two bars long. This pattern is sent by the server to the clients who then cycle continually through the two bar pattern. This is illustrated in FIG. 3 in which reference 30 denotes the data stream defined by a client and sent to the server. Reference 32 represents the same data stream played by the clients repeated over and over again.

Thus, the server sends a data stream indicating a portion or musical snippet of some set length of time to each of the clients other than the one at which it was generated. The clients receive the data and synchronize it relative to their local clock. The snippet or pattern is repeated over and over again. The sequence that each client has generated itself is already synchronised to the local clock having been time stamped before being sent to the server.

It will be seen that each client will have the same musical experience. It does not matter that there are inherent propagation delays as the musical sequences are only dependent on a relative time set by each local clock. Thus, it does not matter if the inherent delays to each client are different.

Figure 4:
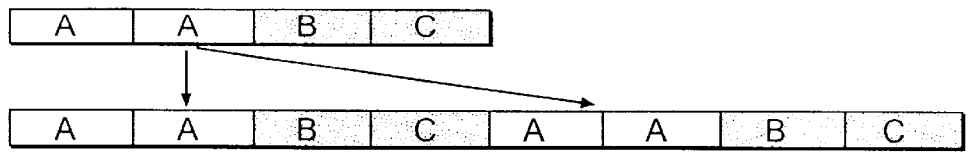
FIG. 4, is a schematic diagram showing how a plurality of data streams may be looped.

Whilst the looping of sequences overcomes the problems of delay, it is artistically limiting or inappropriate in some situations. FIG. 4 illustrates how an extra degree of sophistication may be added by creating a sequence of sequences and repeating the sequence of sequences over and over again. in FIG. 4 three sequences A, B and C are generated. Of course, these three sequences can be created into any arbitrary sequence, here A, A, B, C. This four segment sequence is sent to the server which distributes to each of the other clients where it is looped continually. Thus the stream played at each client is AABCAABC Etc.

Figure 5:
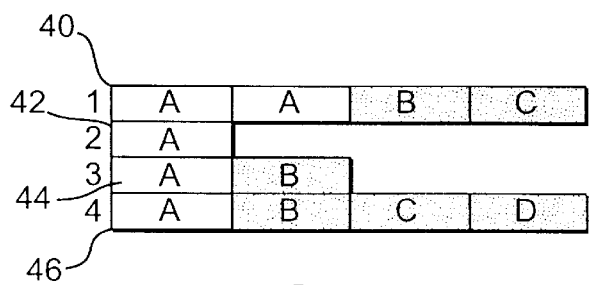
FIG. 5, is a representation of a four part score expressed as data streams.
Figure 6:
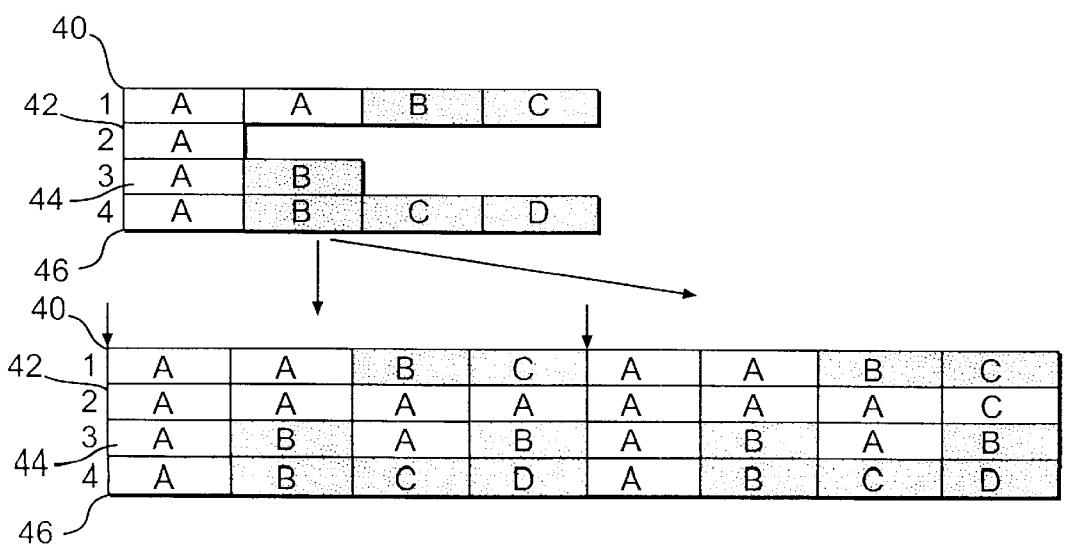
FIG. 6, shows how the score of FIG. 5 would sound when played back by the client software.
Figure 7:
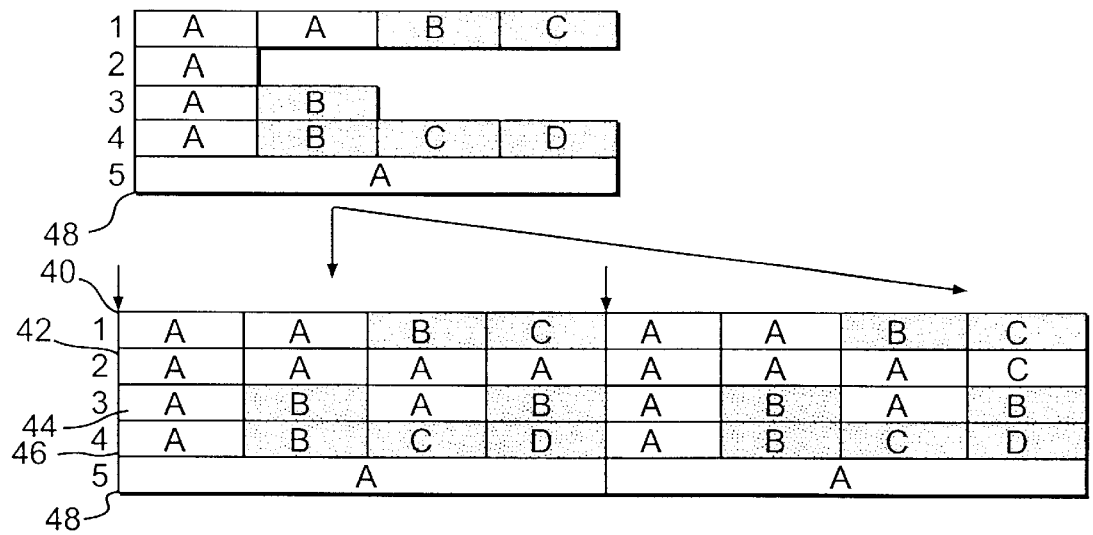
FIG. 7, shows how a fifth part having a longer data stream may be introduced into the score.

FIG. 5 shows how a network of four clients can produce a four part score. The four parts 1 to 4 may be, for example, a snare drum, bass, guitar and piano. The snare drum line 40 is a sequence AABC, the bass 42 a simple sequence A, the guitar 44 AB and the piano 46 ABCD. The respective client sends, the sequence to the server who distributes each of the sequence of sequences to each of the other clients. The resultant score played back by each client is shown in FIG. 6;

In the example shown, each of the sequences are of equal length. This need not be the case. FIG. 7 shows the example of a fifth part 48 added which is a single sequence four times the length of the sequences used by each of the other parts. Thus in the example the fifth part sequence A may be an eight bar sequence. It does not matter that it is of a different length as its data has been time stamped with relative clock values. The length of the sequence is also arbitrary although unusual lengths can produce phasing effects; the alignment changing with the other patterns. It would be more usual for sequence length to be linked to a musical characteristic such as a chord progression and it is usual for longer sequences to be an integral multiple of the shortest sequence.

Figure 8:
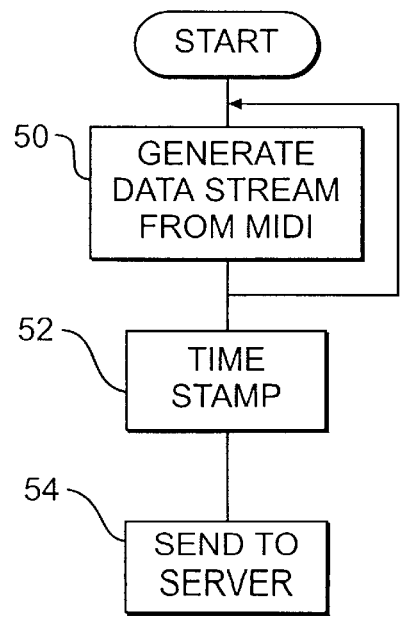
FIG. 8, is a flow diagram showing in outline the operation of the server.

The operation of the client in generating a sequence or sequence of sequences is shown in FIG. 8. The first sequence is first generated at step 50 followed by subsequent sequences if appropriate and the whole is then time stamped at step 52 and sent to the server at step 56.

Figure 9:
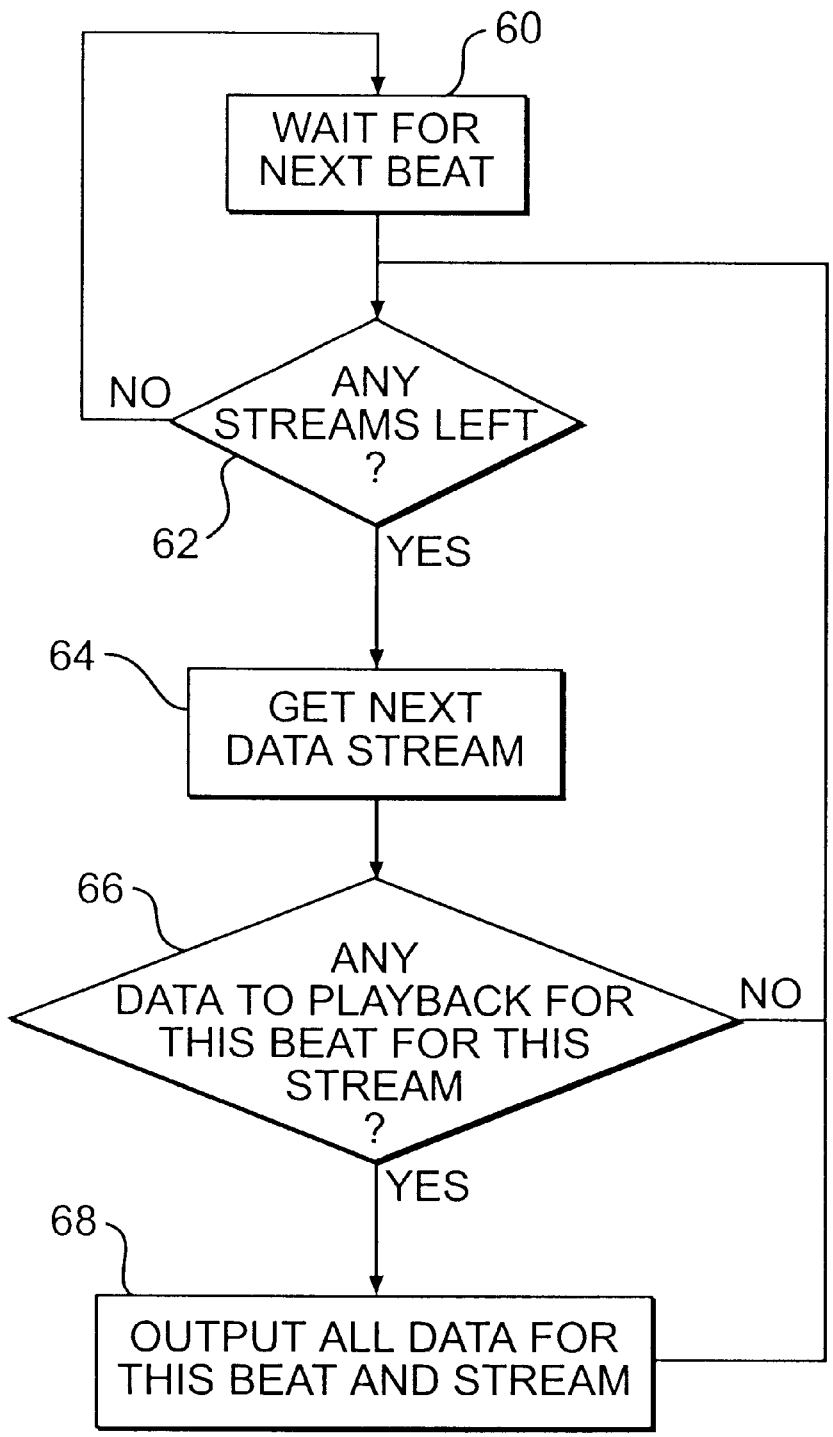
FIG. 9, is a flow diagram showing how a local clock is used in each client.

The operation of the time stamp and the local clock is illustrated by the flow chart of FIG. 9. The local clock is, as explained earlier, a relative clock used by synchronised data streams (sequences) received from the server with the locally produced sequences. The clock is set to produce a series of beats or pulses a variable time apart. The beats are typically a number of milliseconds apart and the sequence data is aligned with this clock.

At step 60 the client waits for the next beat to be generated by the clock and t he clients monitor the beat it is on. At a step 62 the client checks whether there are any streams left to play, if no, the routine loops back to step 60 to wait for the next beat. The client is stepping through each of the streams checking to see if there is any more data to play. If the answer at step 62 is yes, the software moves on to step 64, at which the next data stream is acquired. At step 66 the client checks to see if there is any data to be played back on the current beat for the current stream. If there is none the routine returns to step 62. If there is data to be output all data for that beat and stream is output in whatever form required. It will be seen that steps 60–66 act as a means for synchronising the received sequences with the local client clock.

In the example given the data format would be MIDI format but it could be in any audio or video format or even a digitally controlled light output at one or more of the data outputs.

The client then checks whether there are any more data streams left to output. If there is none then it waits for the next beat.

The system has been described in the context of 'beats' which are relative time value. This is convenient, as a two or n bar sequence would normally have an integral number of equally spaced beats. However, absolute time values could be used although this is more complex. The timing is still relative as the data from the server is synchronised to the local clock.

Rather than resetting the clock after each sequence, or sequence of sequences, the beat value increases. As can be seen from FIG. 2 the clock 26 includes a counter 29.

Table 1 below helps to show how the system, works to keep parts of different length synchronised. Consider one part, say the bass part. Table 1 indicates how the bass part data might look.
Pattern Length:16

TABLE 1

| Beat | Note | Duration | Volume |
|------|------|----------|--------|
| 1 | C2 | 2 | 64 |
| 3 | D2 | 5.5 | 75 |
| 9 | E2 | 4 | 100 |

As the pattern length is 16 beats the pattern repeats every 16 beats. Thus, on the 1st beat of each loop a C2 is played, a D2 on the third beat and an E2 on the 9th beat. The clock controls and synchronises sequences of multiple lengths arriving at different times by taking the modulo, or remainder, of the division of the pattern length and the overall beat count. Thus, the pattern of table 1 repeats when the local clock steps through 0, 16, 32, 48 etc. If the clock count is on 115, the local client is playing the third beat of the sequence as the sequence is 16 beats in length and 115/116=7 remainder 3. In the sane example a pattern length of 32 would be on the 19th beat as 115/32=3 remainder 19.

From the forgoing description it will be appreciated that the time stamps are relative time values. Thus for each data set all clock values are assumed to be offset from a value of zero. The client simply holds a pointer to the current pattern and the count in the current pattern for each stream. This counter gets incremented with every tick of the local clock. When the counter is equal to the length of the current pattern for the stream it gets reset to 0 and the pattern pointer gets incremented to the next pattern. (If pattern is the last in the macro-pattern—i.e. "D" in "ABCD"— then the pattern pointer is set to point back to the first pattern in the macropattern). There are many methods which can be used to convert local clock values. The module method referred to above works for patterns with all the same lengths as used in the preferred implementation.

Since the client knows the ordering of the data sets (patterns), the length of each pattern, and the value of the constantly incrementing local master clock, it can very easily, by using simple math, determine in what pattern (data set) it should be playing and what position (count) in the data set it is playing for each stream. Each stream has a set of pattern and a macro-pattern(pattern of patterns) which are aligned relative to the other streams and therefore are synchronized, as each stream is basing its output on the same procedure and the same local clock.

It should be noted that other synchronisation methods are possible and will occur to those skilled in the art. The method described allows synchronisation and looping of multiple streams of varying length without limitation.

It will be appreciated from the forgoing description that the data streams from individual clients are brought together at each client end. The client can actually keep each data stream separate, although when the output is audio the data streams sound combined. There is no reason that the data has to be combined.

The treatment of the data streams at the client may be understood from the following simple example.

Let us say there are 3 data streams present in a particular session; the bass, a keyboard, and a trumpet. The data sets for the three instruments may be as follows:

bass: AB kbd: ABCD trpt: A

There are 7 different data sets in total, each paired with a data stream, these patterns may be arranged in an arbitrary order such as bass: AB kbd: ABCD trpt: A These macro-patterns repeat in the manner described previously.

Every time the local clock ticks, the client steps through each stream, and determines whether there is any data to output and outputs it as necessary, it might play a note for example.

Rather than being combined it can be seen that the data streams are perceived as being combined at the local clients, but the client holds the data for each stream as a separate entity. In the code listings at Annex one code is given for one stream object. Each stream objects in this example holds its own data. The data is never combined with other stream objects. It is only heard as if it were combined.

The system described is based on a server which echoes data to a local clients. Each client has the ability to send and receive data and the data sent is comprised of an arbitrary number of data streams which represent a sequence of time stamped events; the time stamp is an arbitrary relative clock value. The sequence of data is looped by the local clients so as to give the impression of a constant musical flow. The sequences sent can themselves be sequences of sequences to enable a more complex musical pattern to be built up. Play back is controlled by the client's local clock to which the data is synchronized using the relative clock values allowing the data streams to be played in time irrespective of client/server/client time delays.

The description has been given assuming that a first client sends information to the server, followed by the second etc.

All patterns have time values which are assumed to be offset from time 0. The local clock's time is arbitrary as is all playback since all of the patterns use these relative clock values. This means that the time at which the local clock of a client starts is arbitrary. One does not have to wait for any one of the clients to start in order for everything to work. All that matters is that the local client have some clock value from which it can offset the relative clock values.

Considering now the structure of the data stream in more detail. Table 2 below shows an example of one suitable format for one of the data streams. The stream comprises a header section and a data section.

TABLE 2

HEADER

Stream ID
Pattern ID
Pattern Length
DATA pair 1
pair 2
pair 3
etc . . . until end of data This data stream could be thought of as one packet or pattern sent from the client to the servers or from the server to the client. It consists of the following elements:

A) Header comprising:

1. Stream ID: When a new stream is created, a new instrument in the music example it is associated with unique ID value. The way the ID is assigned does not matters. All that matters is that each stream has a unique ID value, and that all clients and the server associate this ID with the stream. Thus, when data is sent out for the stream, the scream ID element in the header allows the data to be paired appropriately with the stream.

2. Pattern ID: for each stream, there are multiple patterns. Like streams, each pattern has to be identified—i.e. each pattern must have its own ID. For example a bass pattern could have a pattern "A" and a pattern "B". In this case "A" and "B" are pattern Ids. How the pattern is identified is important as long as there is some standard way of identifying and differentiating the patterns. One could for example use words or numbers. The code example included at Annex 1 uses letters A through to E to identify patterns).

3. Pattern Length: The length of a pattern is not determined by the time of the last time-stamped element in the pattern. A pattern can be 16 seconds long yet have no events at all (i.e. a bass, part pattern could be totally silent. The length of the pattern can be set in one of two ways:

(i) It can have predefined length. For example, in a music program, all patterns can always have a length of 4 measures. The code included at Annex 1 makes this assumption (ii) It can be included as a parameter in the data header B) DATA: the remainder of the data is the time-stamped data pairs. In the instrument part case, this could consist of time/note events. In another case, for example digital video it might consist of time/frame events. There are no constraints on the data. The time stamps are relative time values. That is, the pattern is assumed to start at time 0. This allows the patterns to be played back by the clients relative to the local clock—there is no dependence on absolute time.

The biggest constraint is that one of the time stamp values may be higher than the length of the pattern. That is, if the pattern length is 5 seconds, one would not have an event occurring at 10 seconds.

Thus, when data comes into the client software the following procedure takes place:

1. the client receives the data;

2. the client determines which stream the data is associated with by reading the stream ID from the header of the data packet;

3. the client determines which pattern for the stream the data is by reading the pattern ID out of the header of the data packet;

4. the client determines the length of the pattern by reading the pattern length data element in the data packet;
5. the client reads in the timestamp/data pairs until the end of the data (note: a pattern can be empty. It can have a stream ID, a pattern ID, a pattern length but no data).

So: an example data packet may look like this:

TABLE 3

| HEADER |
| --- |
| Stream ID: 1 |
| Pattern ID: A |
| Pattern length: 6 seconds |
| DATA |
| time: 0.5 seconds |
| note: A1 |
| notelength: 1 second |
| volume: 6.5 |
| time: 1.5 seconds |
| note: B2 |
| notelength: 2 seconds |
| volume: 37 |
| time: 3 seconds |
| note: A1 |
| notelength: 1 second |
| volume: 65 |
| time: 5 seconds |
| note: A1 |
| notelength: 0.5 seconds |
| volume: 65 |

NOTE: the pattern length 6 seconds, but the last event occurs at 5 seconds.

The manner in which loop length is determined will now be described. If the patterns for the screams are different lengths, phasing occurs as mentioned earlier. For example, if you have 3 streams bass, kbd, trumpet and they have macropatterns for which total length is 1, 2 and 3 measures respectively, the sequence will repeat every 6 measures. In other words, the loop length is 6 measures long. Thus, the length of the loop is the lowest number to which all of the total lengths of each stream are a factor. For the lengths 1, 2 and 3 the lowest number for which they all are a factor is 6. If you used seconds as a measure of time, and you have 4 streams with macropatterns of total length 20, 40, 60 and 80 seconds respectively, then the length of the loop would be 240 seconds as 240 is the lowest number to which all lengths are a common factor.

Loop lengths can change dynamically, you might simply change the macropattern for a stream from "AB" to "ABAC" for example, doubling its length. If the rest of the streams were set to only "A" macropatterns this would double the length of the loop.

If people work with patterns which do not line up on even boundaries phasing will occur.

Figure 10:
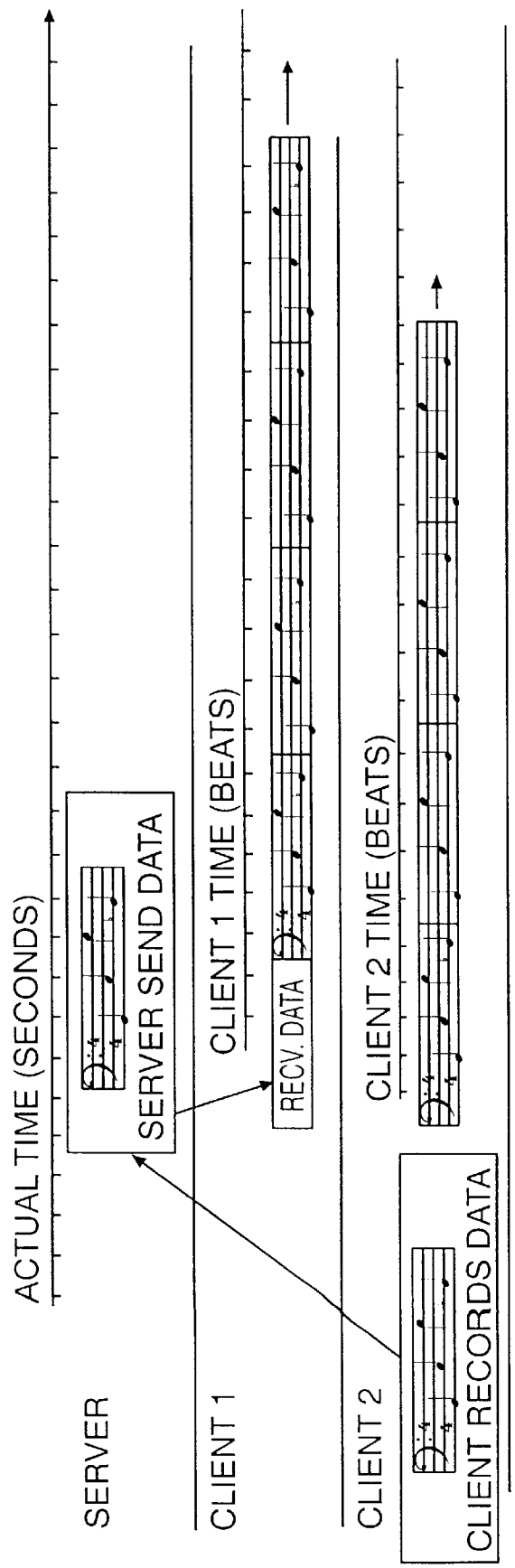
FIG. 10 shows, using conventional musical notation, how a client generates a sequence, and sends it to the server which then echoes it back to each client.
Figure 11:
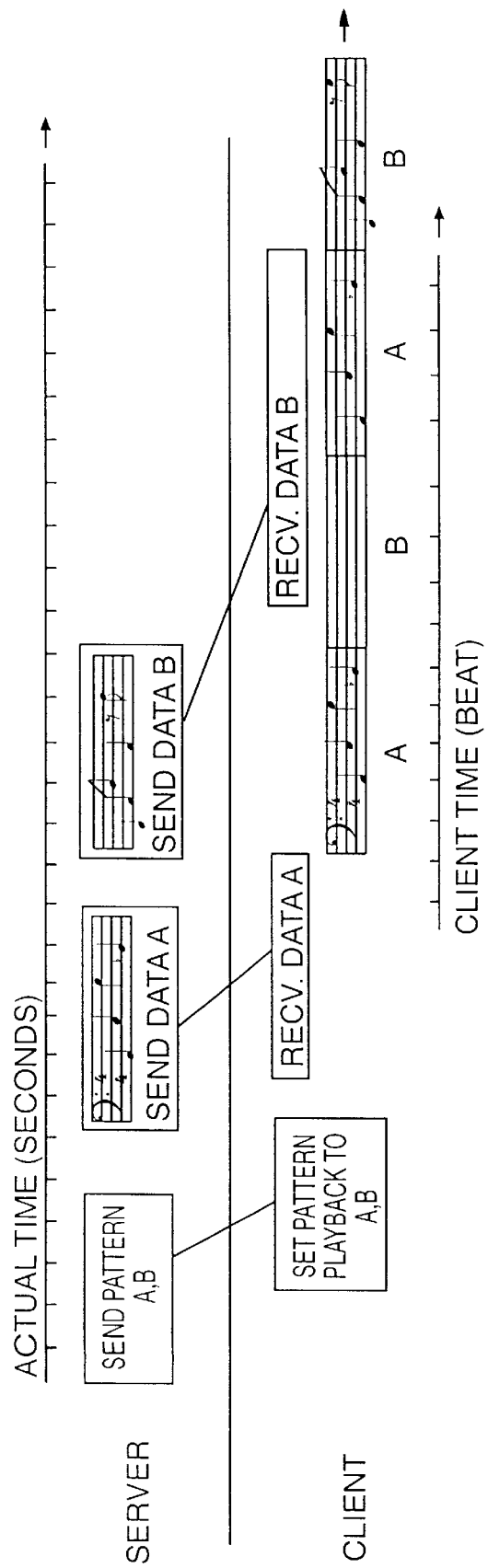
FIG. 11 shows, using conventional musical notation, how the system deals with a sequence which comprises two individual sequences.
Figure 12:
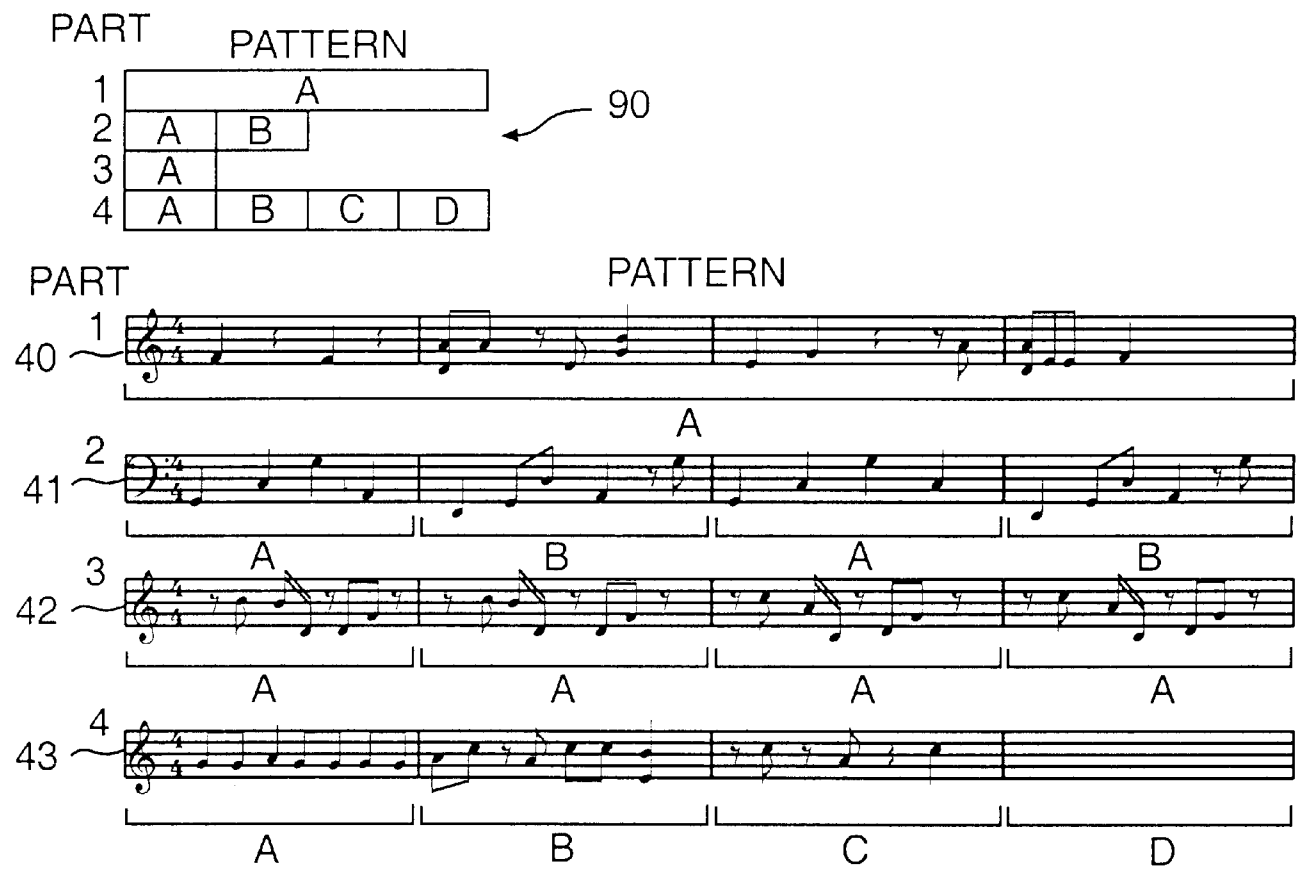

FIGS. 10–12 illustrate the method described with respect to actual musical sequences. In FIG. 10 the method is shown against axis 71 representing actual time. The first stage is for the client to record his sequence. This occurs at 72 where the second client records a bass part comprising a bar of four crotchets: G C G' Bflat. This sequence is then sent to the server at 74 which echoes thdl pattern to the other client. The clients each have their own local clocks running and the received data is played back at the first client by repeating the sequence over and over again, and at the second client by repeating the generated sequence over and over again. It can be seen in the figure that the one bar sequence is repeated four times although in practice it is a very much greater number. The relative timing of the notes in the sequence is maintained as the first client is controlled by its local clock. However it can be seen by comparison of the first and second clients' local clocks that the the two are not synchronised to one other. As explained earlier this is immaterial as the player has no perception of what is being heard at any of the other clients.

FIG. 11 illustrates in more detail what happens, when a pattern of two sequences is generated by one of the clients. In this illustration only one client is shown for convenience. The server has received a pattern comprising sequence A followed by sequence B. As can be seen frown the illustration, sequence A is the same four note Combination as described in the previous figure. Sequence B comprises a low C crotchet followed by a G quaver and a D quaver, then an A crotchet, a quaver rest and a G' quaver. As illustrated by boxes 80,82, the server sends the two sequence pattern to the client which sets its playback pattern to the received sequence AB. Sequence A is received first and played back, the sequence B is received and played back with no musical discontinuity between the two sequences. The client then repeats the sequence of sequences ABABABABAB etc. as often as required.

FIG. 12 shows the musical notation of a four client session shown schematically at 90. The first part comprises a single sequence which lasts for four bars; the second part comprises a pair of sequences AB each lasting one bar and corresponding to the sequences of FIG. 11; the third part comprises a single one bar sequence and the fourth part comprises four one bar sequences A, B, C, D. The clients will hear the first part repeated every four bars, the second part repeated every two bars, the third part repeated every bar and the fourth part repeated very four bars.

In the embodiment described the server does not echo a sequence back to the client from which it was sent. This is preferred as there is no need to receive the data which is already synchronised to the sending clients local clock. However the server could send the data back to the sending client although this would increase the amount of data the server is required to send.

The attached annex shows a code listing for a simple stream object. Each stream object is separate but uses the same code and runs in parallel. This code shows a very simple implementation of the looping concept with fixed pattern lengths. It works using relative local clock values; the local clock constantly cycles and so looking at the code as it runs could not give a determination of absolute time. The code also cycles through patterns of patterns.

Figure 13:
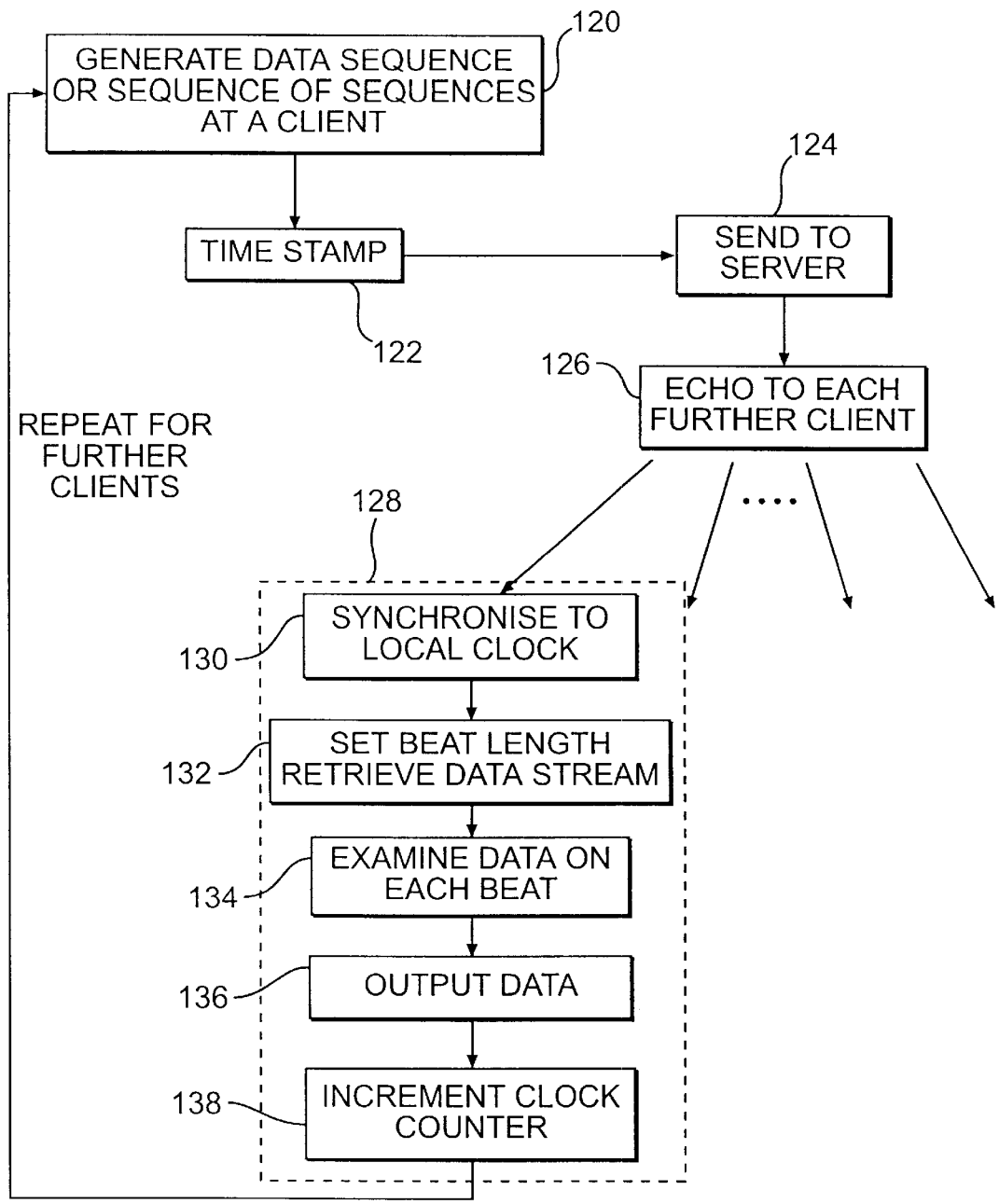
FIG. 13 is a schematic overview of the method and processing units used in the system of FIGS. 1 to 12.

FIG. 13 summarises the functional steps in the method described. It may also be regarded as a functional block diagram of the hardware requirements of the system or the hardware equivalents to the steps performed by software. Thus, at 120 a client computer generates a sequence of data or a sequence of sequences. This data is time stamped at step 122 and sent to a server at step 124. The server then echoes the data out to each further client at step 126. In the step represented by chain dotted line 128, a representative local client receives the data, synchronised to its own local client and plays back the data. More specifically the data is synchronised at step 130 and at step 132. The local client sets the beat length and on each beat performs the following steps:

(i) Step 132 retrieves a data stream;
(ii) Step 134 examines the data;
(iii) Step 136 outputs the data; and
(iv) Step 138 increments the clock counter The steps 120 to 138 are performed for each of the client computers.

One drawback of the embodiment described is that it does not permit improvisation. Each player must play using the looping structure described although there is a certain degree of flexibility in the structure of the each loop.

It is to be understood that the attached code listing is only one exemplary embodiment and other implementation approaches are acceptable and will be clear to those skilled in the art.

Figure 14:
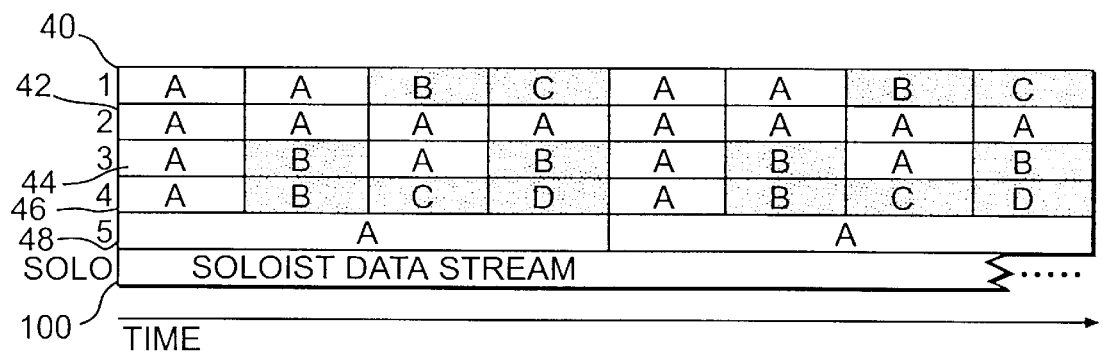
FIG. 14 is a schematic diagram showing how an improvised solo part may be added to the five part ensemble of FIG. 7 and which embodies a second aspect of the invention.

A further aspect of the invention permits one player to improvise freely without being constrained by the looping procedure. This is illustrated in FIG. 14 in which the sixth player 100 (Shown as 'solo')is a soloist improvising freely over the other five players. In other words, the sixth line is not a series of repeating loops but a continuous musical line.

Figure 15:
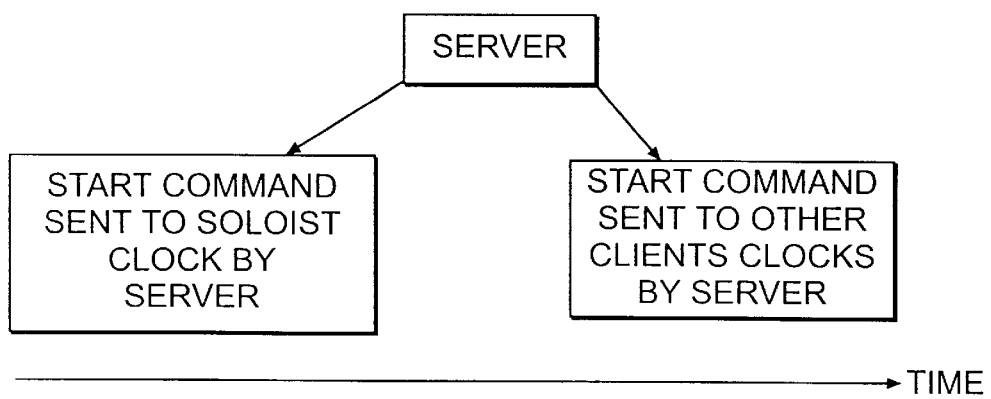
FIG. 15 illustrates how the solo part is started before the remaining clients.

Local clients can have their clocks started by a start command sent to each client by the server. As the Start command can be sent simultaneously to each client, the clients will be roughly synchronised. Synchronism will not be exact but will be within the largest transfer delay for any of the clients. For example if the average network delays for three clients is 100 ms, 1500 ms and 500 ms respectively, their respective clocks will be synchronised to within 1500 ms. Because the clients can each be triggered individually by the server, groups of clients can be synchronised at separate times. Thus the server can delay all except one of the clients. This is illustrated in FIG. 15 in which the soloist's clock (that is the improviser's clock) is started by a start command sent to it from the server. Then, some time later, each of the other clients are started by a Start command from the server.

In this case all but one of the clients are roughly synchronised behind the a single client (the solo line). The soloist can then send out a continuous stream of data to the rest of the clients who buffer the data from the solo client in a buffer 70 (FIG. 2) and synchronise it with their local clock. Because the rest of the data streams the instrumental parts are looped in the manner described previously, the delay between the solo client and the rest of the synchronised parts does not disturb the continuity of the time dependent data for any of the clients. The delay problems between all of the clients is handled by the looping procedure described. Whilst the non-solo data sent to the solo client arrives after the solo line has started, it is a set of repetitive sequences and so can be synchronised to the local clock at the solo client.

Thus the solo client sends out a continuous stream of data time stamped relative to the soloists local clock. This data is sent to the server which, in turn, echoes the data to all of the other clients which have their local clocks roughly synchronised behind the solo client. Because the data is synched relative to the local clock, the free improvisation of the soloist will be heard in synch with the looped data. The looping technique allows both the soloist and the relatively delayed roughly synchronized clients to have the same perception of musical continuity despite their differences in absolute time.

Time stamping of the soloist is a special case of the procedure outline earlier. The soloist is treated as one huge pattern which is sent in parts to the client; its doesn't actually loop per se. It can be thought of as a constantly augmenting pattern of patterns, or as one pattern which is sent in chunks.

Variability of loop length and determination of loop length is a little different with the soloist line. The free soloist part can simply be thought of as one very long pattern which is sent in chunks. The client simply threads the soloist data together. When using the soloist, one would probably want to have the loop length already set, so as to not change the alignment of the soloists playing on the fly, though this could produce interesting although not necessarily aesthetically pleasing results.

Figure 16:
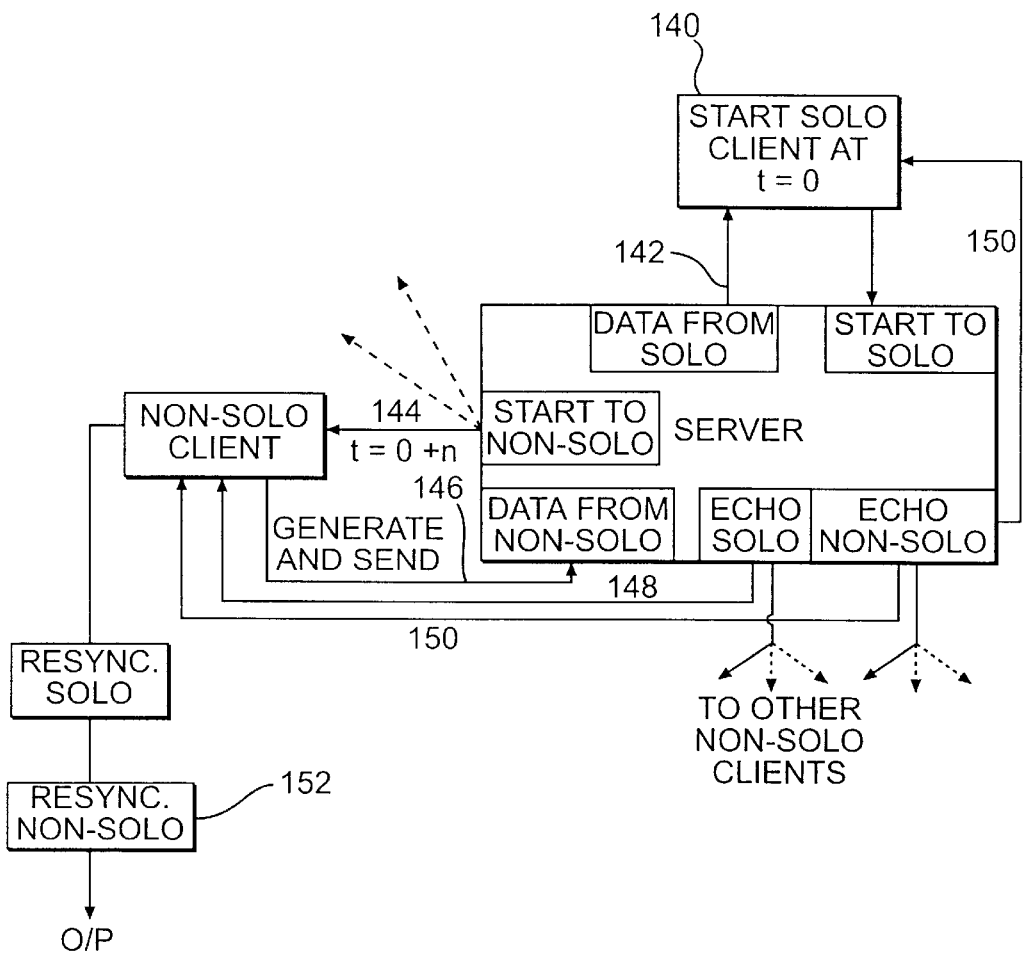
FIG. 16 is an overview similar to FIG. 13 for the second aspect of the invention.

FIG. 16 shows an overview of the solo line embodiment of the invention similar to that of FIG. 13.

The invention has been described in terms of one client freely improvising. This means that one solos client computer provides the improvised line. It does not mean that only one individual solo at a time. Groups of players could be playing into the client with a powerful enough computer and a high enough bandwidth, a whole orchestra could solo as long as they are being recorded by the same client.

Similarly, the sequences for any of the other clients, or all the clients in the first embodiment, could be provided by a number of players all being recorded by the same client.

At step 140 the solo client is started by a start command sent from the server. The solo client then, at 142 sends a continuous stream of data to the server. At a time T=0+n the server, at step 144 sends a start command to the non-solo clients. These clients, at step 146, generate a sequence of data and send it to the server. At step 148, the server echoes the continuous data stream from the solo client to each of the non-solo clients and the clients re-synchronise the received data with the respect local clocks in the manner described in relation to the first aspect of the invention. The server, at step 150 also echoes the data sequences received from the non-solo clients to the solo client and to the non-solo clients either including or excluding the client which generated the data. That received data is in turn resynchronised at step 152 and the data from the solo and non-solo clients may be output at each client in a manner described previously.

Attached as an Annex A is a software listing which is not to be printed with the patent.

What is claimed is:

1. A method for synchronising data from a plurality of sources over a client-server network comprising the steps of:

sending a first start command from the server to a first client to start a local clock at said first client;

sending a continuous stream of data from said first client to said server;

sending a further start command from the server to a plurality of further clients to start a local clock in each of said further clients, said further start command being delayed with respect to said first start command;

sending a sequence of data from each of said plurality of further clients to said server;

sending said continuous data stream from said server to each of said plurality of further clients;

re-synchronising said received continuous data stream at each of said plurality of further clients;

sending the data sequences from said server to each of said plurality of further clients and to said first client; wherein said step of sending either includes or excludes sending a given data sequence back to a respective further client from which it was sent;

re-synchronising the received data sequences at each of said clients to the local clock; and repeating the received and locally generated data sequences at each of said clients a plurality of times.

2. A method according to claim 1, wherein one or more of said sequences of data comprises a sequence of sequences of data.

3. A method according to claim 1, wherein each data sequence is representative of a musical instrumental part.

4. A method according to claim 3, wherein one or more of said data sequences is generated by a Musical Instrument Digital Interface (MIDI) device.

5. A method according to claim 4, comprising playing back the received data sequences on said MIDI device.

6. A method according to claim 1, wherein the sequence of data sent by each client co the server comprises data about a sequence of one or more musical notes and includes the relative timing of the note, and other parameters describing the note.

7. A method according to claim 1, wherein the length of each data sequence is variable.

8. A method according to claim 1, wherein the length of the data sequence produced by each client is the same.

9. A method according to claim 1, wherein one or more clients generate a data sequence having a length different to that of said first data sequence.

10. A method according to claim 2, wherein the length of each sequence of said sequence of sequences is the same.

11. A method according to claim 2, wherein the sequences comprising said sequence of sequences have different lengths.

12. A method according to claim 9, wherein the length of each longer sequence is an integral multiple of the length of the shortest sequence.

13. A method according to claim 1, comprising, for each local clock:
setting a beat length; and
on each beat:
a) retrieving a data stream from the server;
b) examining the data stream for data to be played back;
c) outputting the playback data; and
d) repeating steps a) to c) for any remaining data streams.

14. A method according to claim 13, wherein each local clock includes a counter, comprising the step of incrementing the counter every beat.

15. A method according to claim 14, wherein the data sequence sent to each client includes sequence length data, comprising the step of dividing the cumulative count of said counter by the sequence length and determining the present sequence beat from the remainder.

16. Apparatus for synchronizing data from a plurality of sources over a client-server network comprising:
means for sending a first start command from the server to a first client to start a local clock at said first client;
means for sending a continuous stream of data from said first client to said server;
means for sending a further start command from the server to a plurality of further clients to start a local clock in each of said further clients, said further start command being delayed with respect to said first start command;
means for sending a sequence of data from each of said plurality of further clients to said server;
means for sending said continuous data stream from said server the each of said plurality of further clients;
means for re-synchronising said received continuous data stream at each of said plurality of further clients;
means for sending the data sequences from said server to each of said plurality of further clients and to said first client;
means for re-synchronising the received data sequences at each of said clients to the local clock; and
means for repeating the received data sequences at each of said clients a plurality of times.

17. Apparatus according to claim 16, wherein one or more of said sequences of data comprises a sequence of sequences of data.

18. Apparatus according to claim 16, wherein each data sequence is representative of a musical instrumental part.

19. Apparatus according to claim 18, wherein said generating means comprises a Musical Instrument Digital Interface (MIDI) device.

20. Apparatus according to claim 19, comprising means for playing back the received data sequences on said MIDI device.

21. Apparatus according to claim 18, wherein the sequence of data sent by each client to the server comprises data about a sequence of one or more musical noses and includes the relative timing of the note, and other parameters describing the note.

22. Apparatus according to claim 16, wherein the length of each data sequence is variable.

23. Apparatus according to claim 16, wherein the length of the data sequence produced by each client is the same.

24. Apparatus according to claim 16, wherein one or more clients generate a data sequence having a length different to that of said first data sequence.

25. Apparatus according to claim 17, wherein the length of each sequence of said sequence of sequences is the same.

26. Apparatus according to claim 17, wherein the sequences comprising said sequence of sequences have different lengths.

27. Apparatus according to claim 24, wherein the length of each longer sequence is an integral multiple of the length of the shortest sequence.

28. Apparatus according to claim 16, comprising, for each local clock:
means for setting a beat length;
means for retrieving a data stream from the server on each beat;
means for examining on each beat the data stream for data to be played back; and
means for outputting the playback data on each beat.

29. Apparatus according to claim 28, wherein each local clock includes a counter, the apparatus further comprising means for incrementing the counter every beat.

30. Apparatus according to claim 29, wherein the data sequence sent to each client includes sequence length data, the apparatus further comprising means for dividing the cumulative count of said counter by the sequence length and determining the present sequence beat from the remainder.

* * * * *

UNITED STATES PATENT AND TRADEMARK OFFICE
CERTIFICATE OF CORRECTION

PATENT NO. : 6,009,457
DATED : December 28, 1999
INVENTOR(S) : Matthew D. Moller It is certified that error appears in the above-identified patent and that said Letters Patent is hereby corrected as shown below:

IN THE CLAIMS:

Claim 6, column 13, line 2, "co" should read --to--.

Signed and Sealed this

Twenty-fourth Day of October, 2000

Attest:

Q. TODD DICKINSON

*Attesting Officer*  *Director of Patents and Trademarks*